(12) United States Patent
Hernandez et al.

(10) Patent No.: US 12,626,604 B2
(45) Date of Patent: May 12, 2026

(54) REAL-TIME AIRCRAFT FLIGHT DELAY PREDICTION

(71) Applicant: The Boeing Company, Chicago, IL (US)

(72) Inventors: Andres Munoz Hernandez, Munich (DE); Manuel Polaina Morales, Munich (DE); Alejandro Güemes Jiménez, Madrid (ES)

(73) Assignee: The Boeing Company, Arlington, VA (US)

( * ) Notice: Subject to any disclaimer, the term of this patent is extended or adjusted under 35 U.S.C. 154(b) by 352 days.

(21) Appl. No.: 17/664,187

(22) Filed: May 19, 2022

(65) Prior Publication Data

US 2023/0377466 A1     Nov. 23, 2023

(51) Int. Cl.
*G08G 5/26* (2025.01)
*G06N 20/00* (2019.01)
(Continued)

(52) U.S. Cl.
CPC .............. *G08G 5/26* (2025.01); *G06N 20/00* (2019.01); *G08G 5/30* (2025.01); *G08G 5/56* (2025.01); *G08G 5/727* (2025.01); *G08G 5/76* (2025.01)

(58) Field of Classification Search
CPC .... G08G 5/0013; G08G 5/003; G08G 5/0043; G08G 5/0082; G08G 5/0091;
(Continued)

(56) References Cited

U.S. PATENT DOCUMENTS

| | | | |
|---|---|---|---|
| 11,024,182 B2 | 6/2021 | D'Alto et al. | |
| 11,189,968 B2 | 11/2021 | Ross et al. | |
| | | (Continued) | |

FOREIGN PATENT DOCUMENTS

| | | | | |
|---|---|---|---|---|
| CN | 111652427 B | * | 12/2023 | ............. G06N 20/00 |
| JP | 7345530 B2 | * | 9/2023 | ............... G06N 3/04 |

OTHER PUBLICATIONS

Gui, "Flight Delay Prediction Based on Aviation Big Data and Machine Learning", IEEE Transactions on Vehicular Technology vol. 69, No. 1, Jan. 2020. (Year: 2020).*
(Continued)

*Primary Examiner* — Tiffany P Young
*Assistant Examiner* — Shien Ming Chou
(74) *Attorney, Agent, or Firm* — Alleman Hall LLP

(57) ABSTRACT

Examples are disclosed that related to providing flight-delay estimations of airborne flights in a real-time environment. In one example, an aircraft information message for a current aircraft flight is received. The aircraft information message has a designated format consumable by a machine learning model previously trained to assess delay predictions for aircraft flights. The aircraft information message includes one or more aircraft flight-plan parameters, one or more aircraft surveillance parameters, and one or more weather parameters for the current aircraft flight. The aircraft information message is provided as input to the machine learning model to assess a real-time delay prediction for the current aircraft flight based at least on the one or more flight-plan parameters, the one or more aircraft surveillance parameters, and the one or more weather parameters included in the aircraft information message.

20 Claims, 8 Drawing Sheets

(51) Int. Cl.

| | |
|---|---|
| *G08G 5/30* | (2025.01) |
| *G08G 5/56* | (2025.01) |
| *G08G 5/72* | (2025.01) |
| *G08G 5/76* | (2025.01) |

(58) Field of Classification Search

CPC ........ G08G 5/0026; G08G 5/00; G06N 20/00; G06Q 10/04; G06Q 50/40; G06F 9/5027

USPC ......................................................... 701/120

See application file for complete search history.

(56) References Cited

U.S. PATENT DOCUMENTS

| | | | |
|---|---|---|---|
| 2020/0193841 A1* | 6/2020 | D'Alto ................. | G08G 5/0013 |
| 2021/0358313 A1 | 11/2021 | Ayhan et al. | |
| 2022/0139232 A1 | 5/2022 | Lopez Leones et al. | |
| 2022/0245448 A1* | 8/2022 | Ni ........................... | G06N 20/00 |
| 2024/0233560 A1* | 7/2024 | Baldwin .................. | G08G 5/53 |

OTHER PUBLICATIONS

Kang, "DeCUVE: Deep Learning Cloud Unified Virtual Environment", 2017 international conference of computational science and computational intelligence. (Year: 2017).*

Takase, "Difficulty-weighted learning: A novel curriculum-like approach based on difficult examples for neural network training", Expert system with applications 135 (2019), 83-89 (Year: 2019).*

Donovan, "Enhancing Traffic Flow Management: The Airport Surface's Role", Digital Avionics Systems Conference, 2002. Proceedings. The 21stVolume: 1, IEEE 2002 (Year: 2002).*

European Patent Office, Extended European Search Report Issued in Application No. 23173537.4, Dec. 7, 2023, Germany, 11 pages.

Zhang, K. et al., "Spatio-Temporal Data Mining for Aviation Delay Prediction," Proceedings of IEEE 39th International Performance Computing and Communications Conference, Nov. 6, 2020, Virtual, 7 pages.

Ayhan, S. et al., "Predicting Estimated Time of Arrival for Commercial Flights," KDD'18, Proceedings of the 24th ACM SIGKDD International Conference on Knowledge Discovery & Data Mining, Aug. 19, 2018, London, England, 10 pages.

Casado, E. et al., "Estimated Time of Arrival Sensitivity to Aircraft Intent Uncertainty," IFAC, vol. 51, No. 9, 2018, 6 pages.

Chakrabarty, N., "A Data Mining Approach to Flight Arrival Delay Prediction for American Airlines," Proceedings of 2019 9th Annual Information Technology, Electromechanical Engineering and Microelectronics Conference (IEMECON), Mar. 13, 2019, Jaipur, Rajasthan, 6 pages.

"Network Operations Report 2019 Main Report," Eurocontrol, Available Online at https://www.eurocontrol.int/sites/default/files/2020-04/nm-annual-network-operations-report-2019-main-report.pdf, Apr. 28, 2020, 76 pages.

"Regulation (EC) No. 261/2004 of the European Parliament and of the Council of Feb. 11, 2004," Official Journal of the European Union, Available Online at https://eur-lex.europa.eu/resource.html?uri=cellar:439cd3a7-fd3c-4da7-8bf4-b0f60600c1d6.0004.02/DOC_1&format=PDF, Feb. 17, 2004, 7 pages.

Gui G. et al., "Flight Delay Prediction Based on Aviation Big Data and Machine Learning," IEEE Transactions on Vehicular Technology, vol. 69, No. 1, Jan. 2020, 11 pages.

Klein, A. et al., "Airport delay prediction using weather-impacted traffic index (WITI) model," Proceedings of the Digital Avionics Systems Conference (DASC), 2010 IEEE/AIAA 29th, Oct. 3, 2010, Salt Lake City, Utah, 13 pages.

Murphy, J. et al., "Physics-Based and Parametric Trajectory Prediction Performance Comparison for Traffic Flow Management," Proceedings of AIAA Guidance, Navigation, and Control Conference and Exhibit, Aug. 11, 2003, Austin, Texas, 11 pages.

Pyrgiotis, N. et al., "Modelling delay propagation within an airport network," Transportation Research Part C Emerging Technologies, vol. 27, Feb. 2013, 16 pages.

Rebollo, J. et al., "Characterization and Prediction of Air Traffic Delays," Transportation Research Part C: Emerging Technologies, vol. 44, Jul. 2014, 20 pages.

Reisman, R. et al., "Modeling Tactical Trajectory Accuracy Effects on Traffic Flow Management Operations," Proceedings of 7th AIAA Aviation Technology, Integration and Operations Conference (ATIO), Sep. 18, 2007, Belfast, Northern Ireland, 16 pages.

Kern, C. et al., "Data-Driven Aircraft Estimated Time of Arrival Prediction," Proceedings of 2015 Annual IEEE Systems Conference (SysCon) Proceedings, Apr. 13, 2015, Vancouver, British Columbia, 7 pages.

Wang, Z. et al., "A hybrid machine learning model for short-term estimated time of arrival prediction in terminal manoeuvring area," Transportation Research Part C Emerging Technologies, vol. 95, Oct. 2018, 21 pages.

Wang, Z. et al., "Automated Data-Driven Prediction on Aircraft Estimated Time of Arrival," Proceedings of Eighth SESAR Innovation Days, Dec. 3, 2018, 8 pages.

Wanke, C. et al., "Modeling Traffic Prediction Uncertainty for Traffic Management Decision Support," Proceedings of AIAA Guidance, Navigation, and Control Conference and Exhibit, Aug. 16, 2004, Providence, Rhode Island, 13 pages.

Xu, N. et al., "Estimation of Delay Propagation in the National Aviation System Using Bayesian Networks," Proceedings of 6th USA/Europe Air Traffic Management Research and Development Seminar, Jun. 27, 2005, Baltimore, Maryland, 11 pages.

Yu, B. et al., "Flight delay prediction for commercial air transport: A deep learning approach," Transportation Research Part E: Logistics and Transportation Review, vol. 125, May 2019, 19 pages.

* cited by examiner

REAL-TIME AIRCRAFT FLIGHT DELAY PREDICTION

FIELD

The present disclosure relates generally to the field of aircraft flight traffic monitoring, and more specifically to providing real-time flight-delay predictions of aircraft flights in a large-scale environment.

BACKGROUND

In recent years, the volume of aircraft flights has significantly increased causing corresponding increases in requirements for monitoring and management of such aircraft flights. However, existing aircraft flight monitoring and management systems have not been able to keep pace with the increased volume. One primary issue is a lack of accuracy in predicting when an aircraft flight will arrive at a destination. Such a lack of flight-delay prediction accuracy leads to inefficient management of airport resources. Further, such a lack of flight-delay prediction accuracy leads to increases in the number and extent of flight delays at airports, thereby negatively affecting wait times experienced by passengers. Further still, such a lack of flight-delay prediction accuracy has a negative economic impact on airline companies that have to compensate passengers for overbooking due to missed aircraft flights.

SUMMARY

To address the above and other issues, examples are disclosed that relate to providing real-time flight-delay predictions of airborne flights in a large-scale environment. In one example, an aircraft information message for a current aircraft flight is received. The aircraft information message has a designated format consumable by a machine learning model previously trained to assess delay predictions for aircraft flights. The aircraft information message includes one or more aircraft flight-plan parameters, one or more aircraft surveillance parameters, and one or more weather parameters for the current aircraft flight. The aircraft information message is provided as input to the machine learning model to assess a real-time delay prediction for the current aircraft flight based at least on the one or more flight-plan parameters, the one or more aircraft surveillance parameters, and the one or more weather parameters included in the aircraft information message.

The features, functions, and advantages that have been discussed can be achieved independently in various embodiments or may be combined in yet other embodiments, further details of which can be seen with reference to the following description and drawings.

DETAILED DESCRIPTION

In the recent years there have been attempts to improve the accuracy of flight-delay predictions using different mathematical formulations of aircraft performance models. Existing aircraft performance models are based on equations of motion aggregated from historical flight data and are mainly ruled by initial and boundary conditions. A drawback to such an approach is the lack of a system definition for applying these existing aircraft performance models in a real-time data-driven environment, since the existing aircraft performance models are configured to process, filter, and analyze historical data and are not applicable in a real-time environment.

Figure 1:
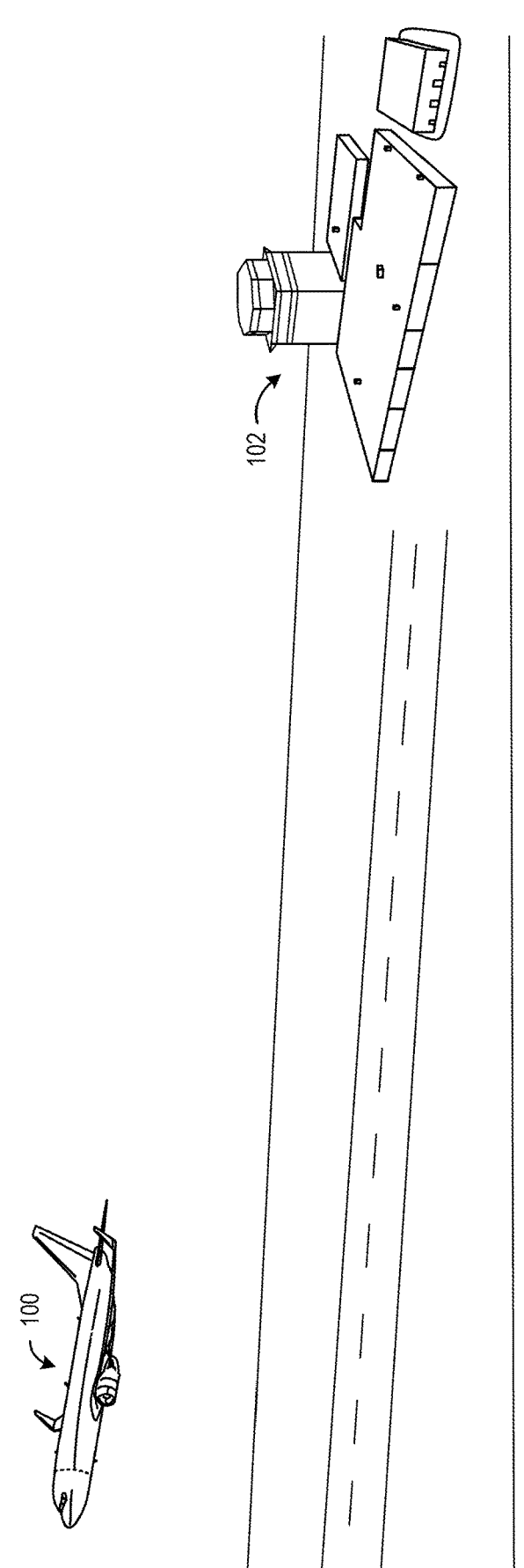
FIG. 1 shows an example scenario of an aircraft in a tactical phase of flight.

FIG. 1 shows an example scenario of an aircraft 100 in a tactical phase of flight. In particular, the aircraft 100 has taken off from an origin airport 102 and is currently in the tactical phase of the flight in which the aircraft 100 is traveling to a destination airport. As discussed above, the accuracy of existing aircraft performance models for predicting flight delays is negatively affected by a lack of information regarding aspects that influence the development of the aircraft flight in this tactical phase. For example, existing aircraft performance models can lack information relating to weather disruptions, air-traffic sector congestions, air traffic controller actions, and any other disruptive event that can take place during the tactical phase of the flight. Such a lack of information considered by existing aircraft performance models results in flight-delay predictions that can have a significant error depending on the events that occur during the tactical phase of a flight.

Accordingly, the present description is directed to a computing system configured to provide real-time flight-delay predictions of airborne flights on a large-scale basis using machine learning models. In particular, a machine learning model is previously-trained to make a real-time prediction of a flight-delay for a current aircraft flight based on flight-plan information, surveillance information, and weather information for the current aircraft flight. The computing system includes a plurality of computing nodes to process substantial amounts of data associated with a large volume of aircraft flights that occur concurrently in an air traffic system (e.g., for a region, a country, a set of countries, a continent, or the entire world). Different computing nodes in the distributed computing system serve separate roles for run-time operation. At least some computing nodes are designated as data consumption computing nodes configured to process incoming data feeds to make the data consumable by machine learning models for different aircraft flights. At least some computing nodes are designated as prediction computing nodes configured to assess a real-time delay prediction for a current aircraft flight using a previously trained machine learning model. Furthermore, at least some computing nodes are designated as training computing node configured to train the machine learning models used by the prediction computing nodes to assess the real-time delay predictions for aircraft flights.

The distributed architecture of the computing system enables the total workload of the computing system to be spread over connected computational elements of the different computing nodes, thus reducing the demand on any single computing node, and allowing for reduced computational times and increased capabilities with respect to serialized processes performed by the computing nodes. Moreover, the distributed architecture of the computing system increases the robustness of the computing system because the computing system does not have to rely on any single computing node to provide a flight-delay prediction (or perform another related computing operation). Instead, if a computing node provides corrupted data, becomes degraded, goes offline, or becomes unavailable for another reason, then a different computing node in the computing system can serve as backup to provide the flight-delay prediction (or perform another related computing operation).

The distributed computing system allows airport authorities and air navigation service providers to more efficiently manage resources based on the increased robustness of the available information. For example, having access to accurate delay times based on real-time data allows for accurate and efficient allocation of the resources required for maintaining proper distancing between aircraft in an airspace network and managing available slots and runways at airports.

Furthermore, airlines can obtain a benefit from this increase in robustness and accuracy of the flight delay information, especially in the turnaround phase of an aircraft when arriving at an airport. Further, such real-time flight delay information would allow an airline to take corrective actions ahead of a predicted disruption, thus reducing the impact of the disruption on a whole airline fleet flight schedule.

Figure 2:
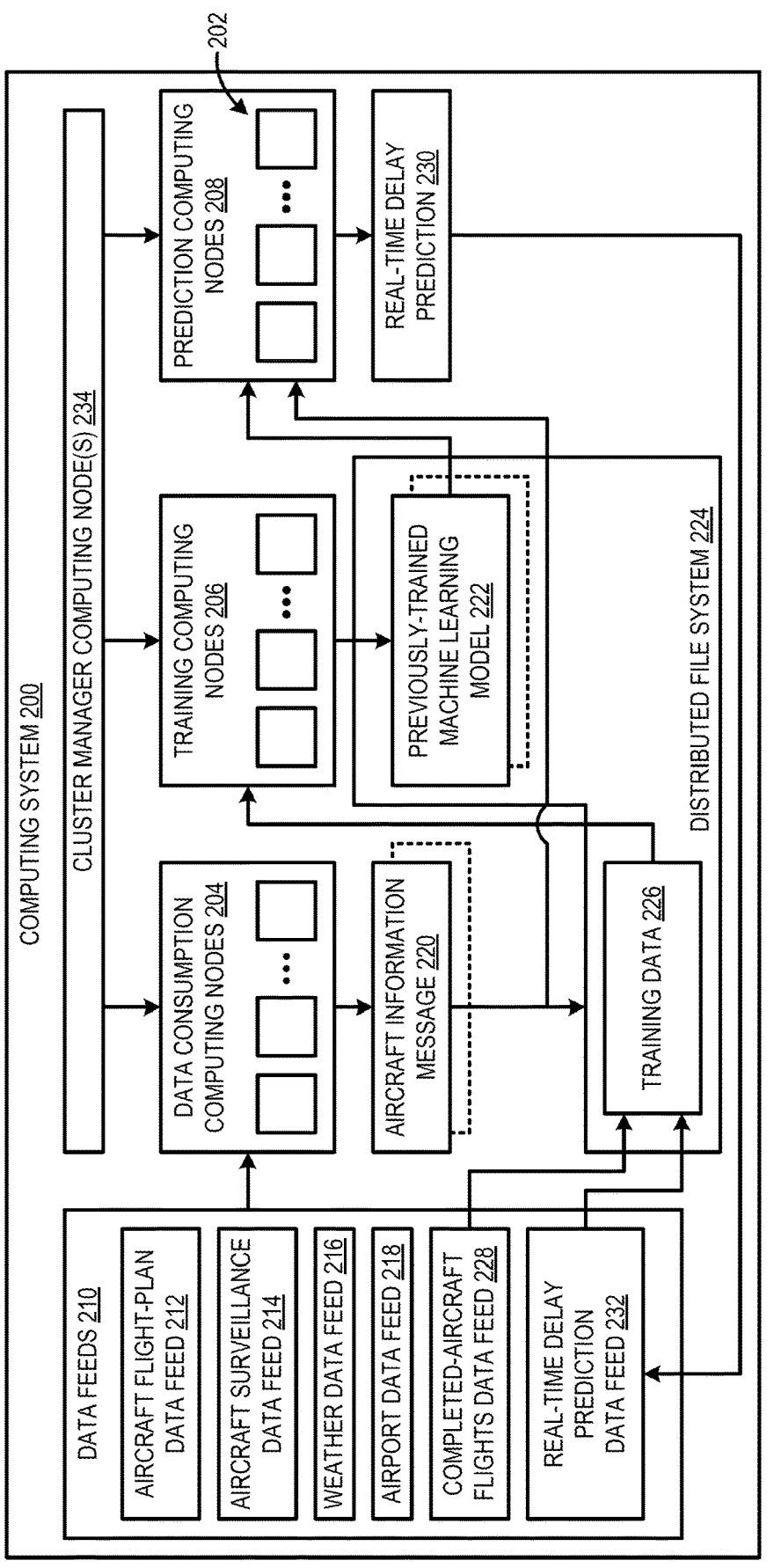
FIG. 2 shows an example computing system configured to provide real-time flight-delay predictions of airborne flights in a large-scale environment.

FIG. 2 shows an example computing system 200 configured to provide real-time flight-delay predictions of airborne flights in a large-scale environment. As one example, the computing system 200 is configured to provide real-time flight-delay predictions for the aircraft 100 shown in FIG. 1. Such real-time flight delay predictions can be based at least on information extracted from a plurality of different data streaming feeds produced for the aircraft 100 at least during airborne flight of the aircraft 100. The computing system 200 includes a plurality of computing nodes 202.

As used herein, a computing node is a physical device/computing component that is configured to send, receive, and/or process information related to real-time aircraft flight-delay predictions. A computing node can take any suitable form. A computing node includes a logic processor, volatile memory, and a non-volatile storage device. A computing node can optionally include a display subsystem, input subsystem, communication subsystem, and/or other components. A computing node includes one or more physical devices configured to execute instructions. Such instructions are implemented to perform a task, implement a data type, transform the state of one or more components, achieve a technical effect, or otherwise arrive at a desired result. In some examples, aspects of the logic processor, volatile memory, and non-volatile storage device are integrated together into one or more hardware-logic components.

Figure 3:
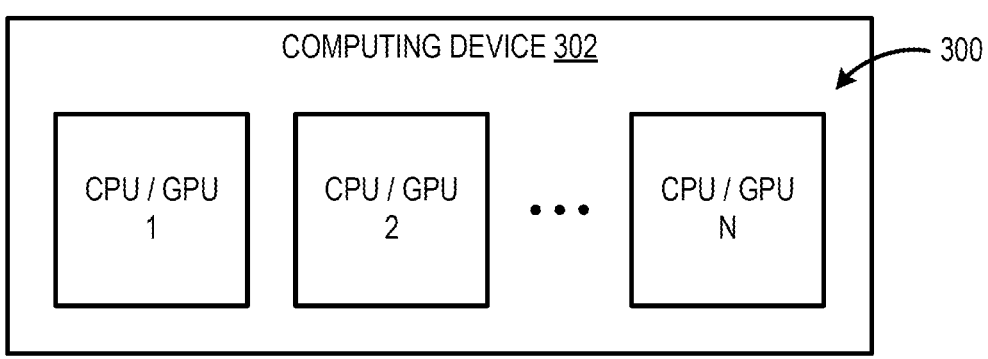
FIG. 3-4 show example computer architectures of a plurality of computing nodes for provide real-time flight-delay predictions of airborne flights in a large-scale environment.

In some examples, as shown in FIG. 3, at least some of the plurality of computing nodes 202 shown in FIG. 2 are embodied as a plurality of different processors 300 in a common physical computing device 302. In some examples, one or more processors of the plurality of processors 300 are embodied as central processing unit (CPU) cores. In some examples, one or more processors of the plurality of processors 300 are embodied as general processing units (GPUs). Different CPUs/GPUs of the computing device 302 are assigned to perform different computing operations related to generating real-time aircraft flight-delay predictions as will be discussed in further detail below. The computing device 302 can include any suitable number of processors that are assigned to perform different computing operations according to any suitable workload management approach.

Figure 4:
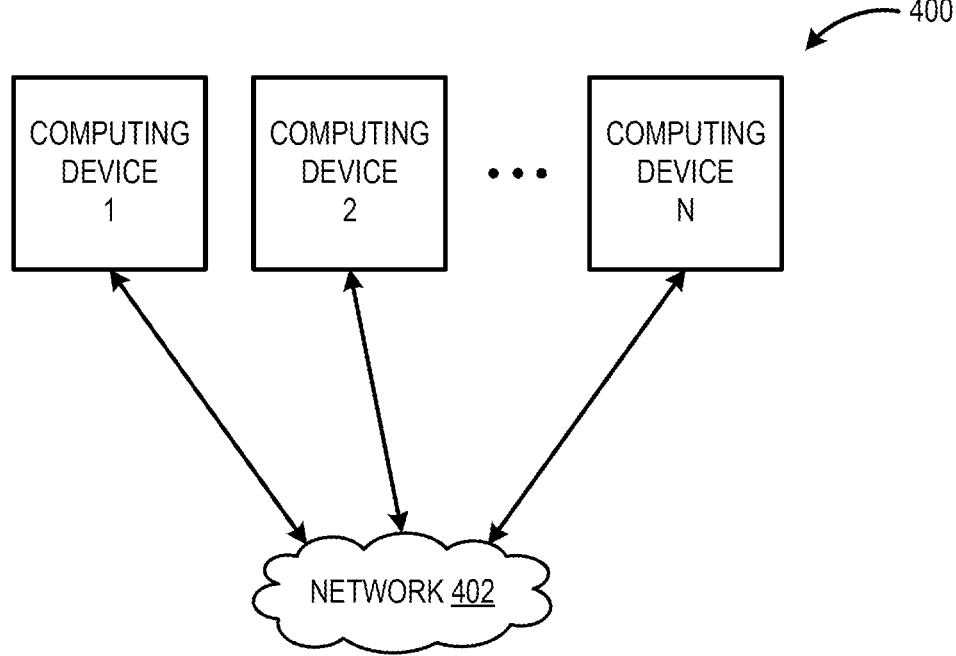

In some examples, as shown in FIG. 4, at least some of the plurality of computing nodes 202 shown in FIG. 2, are embodied as a plurality of discrete computing devices 400 connected via a computer network 402. In some examples, one or more discrete computing devices of the plurality of discrete computing devices 400 are embodied as the computing device 302 shown in FIG. 3. The plurality of discrete computing devices 400 can take any suitable form including personal computers, server computers, tablet computers, network computing devices, mobile computing devices, mobile communication devices (e.g., smart phone), embedded computing devices (e.g., embedded in an aircraft or a weather station) and/or other computing devices.

The plurality of discrete computing devices 400 can be distributed in any suitable manner depending on the scale of the computing system 200 shown in FIG. 2. In some examples, the plurality of discrete computing devices 400 include computing devices associated with different airport authorities in an air traffic system. In some examples, the plurality of discrete computing devices 400 include computing devices associated with different airlines. In some examples, the plurality of discrete computing devices 400 include computing devices associated with different governmental agencies.

Returning to FIG. 2, the computing system 200 is scalable to monitor and provide real-time flight-delay predictions for any suitable number of concurrent aircraft flights. Thus, the plurality of computing nodes 202 of the computing system 200 can include any suitable number of computing nodes to at least handle computing operations for that number of concurrent aircraft flights. For example, the computing system 200 is scalable to monitor every concurrent aircraft flight at any given time across the entire world (and beyond, e.g., including monitoring of space flights).

The plurality of computing nodes 202 of the computing system 200 are designated to perform different computing operations related to providing real-time flight-delay predictions. The plurality of computing nodes 202 include one or more data consumption computing nodes 204, one or more training computing nodes 206, and one or more prediction computing nodes 208.

The data consumption computing node(s) 204 are configured to receive a plurality of different data feeds 210 that include information related to assessing flight-delay predictions for an aircraft flight. A plurality of data feeds is received for each aircraft flight that is monitored by the computing system 200. Note that an aircraft flight can be monitored by the computing system 200 not only during airborne phases of flight but also during ground phases including before a take-off phase and after a landing phase.

In one example, the plurality of different data feeds 210 include an aircraft flight-plan data feed 212, an aircraft surveillance data feed 214, and a weather data feed 216. The aircraft flight-plan data feed 212 includes information related to a flight plan filed for the aircraft flight prior to departure which indicate the aircraft's planned flight path. The aircraft surveillance data feed 214 includes information related to current conditions of the aircraft. In some examples, such conditions may be sensed by sensors on-board the aircraft. The weather data feed 216 includes information related to weather conditions that the aircraft encounters during the aircraft flight. In some embodiments, the plurality of data feeds 210 further include an airport data feed 218.

Different data feeds can be received from various sources. In some examples, the aircraft flight-plan data feed 212 for a designated aircraft flight is received from an airline of the aircraft flight or an airport authority of an origin airport or a destination airport of the aircraft flight. In some examples, the aircraft surveillance data feed 214 for a designated aircraft flight is received from the aircraft itself. In particular, a plurality of aircraft sensors detect/measure current conditions of the aircraft and a plurality of sensor signals/parameters output from the plurality of aircraft sensors are aggregated and fed into the aircraft surveillance data feed 214. In other examples, the aircraft surveillance data feed 214 for a designated aircraft flight is relayed through an entity associated with the airline of the aircraft flight, the aircraft manufacturer, an aircraft regulatory agency, and/or an airport authority. In some examples, the weather data feed 216 is received from a weather service agency or a local weather station/weather-sensing instrument cluster. In some examples, the data consumption computing node(s) 204 are configured to receive the airport data feed 218 from an origin airport and/or a destination airport of the aircraft flight.

The data consumption computing node(s) 204 can be configured to receive any suitable data feed that includes information related to assessing a flight-delay prediction for an aircraft flight from any suitable source. The consumption of the plurality of different data feeds 210 for different aircraft flights are handled by the data consumption computing node(s) 204 using any suitable framework that employs any suitable data handling techniques. In some examples, the data consumption computing node(s) 204 are configured to use a distributed event streaming platform, such as Apache Kafka, to consume the plurality of data feeds 210 for different aircraft flights. Such a distributed event streaming platform provides high-performance data pipelines, streaming analytics, data integration, and mission-critical applications that can be scaled for any suitable volume of data from the plurality of data feeds 210 (e.g., thousands of brokers, trillions of messages per day, pet-abytes of data, hundreds of thousands of partitions). Further, such a distributed event streaming platform enables elasti-cally expandable and contractable storage and processing resources that vary with the volume of concurrent aircraft fights at any given time.

Any suitable number of computing nodes of the plurality of computing nodes 202 can be designated as data consump-tion nodes 204. In some examples, a sub-set of two or more data consumption computing nodes are configured to gen-erate aircraft information messages for different current aircraft flights in parallel. In some examples, a number of computing nodes designated as data consumption nodes 204 are dynamically scaled up and down to accommodate the number of concurrent aircraft flights at any given time. In other examples, the number of computing nodes designated as data consumption nodes 204 are set at a designated number.

The data consumption computing node(s) 204 are con-figured to listen to the plurality of different data feeds 210 to extract relevant information for assessing flight-delay pre-dictions for aircraft flights. In one example, for a designated aircraft flight, the data consumption computing node(s) 204 are configured to extract one or more aircraft flight-plan parameters 502 (shown in FIG. 5) from the aircraft flight-plan data feed 212, one or more aircraft surveillance param-eters 514 (shown in FIG. 5) from the aircraft surveillance data feed 214, and one or more weather parameters 526 (shown in FIG. 5) from the weather data feed 216. In some embodiments, the data consumption computing node(s) 204 are configured to extract an airport delay parameter for the designated aircraft flight from the airport data feed 218. In some examples, the data consumption computing node(s) 204 are configured to extract such relevant parameters by parsing the plurality of data feeds 210 to identify the parameters.

The data consumption computing node(s) 204 are con-figured to generate an aircraft information message 220 for a current aircraft flight that includes the identified param-eters extracted from the plurality of data feeds 210. The aircraft information message 220 has a designated format that is consumable by one or more machine learning models 222 that are previously trained to assess delay predictions for aircraft flights. In some examples, the data consumption computing node(s) 204 are configured to process the gath-ered information from the different data feeds 210 using a big-data environment, such as Apache Spark, to combine the extracted parameters into a single aircraft information mes-sage for the machine learning model(s) 222. The aircraft information message 220 embodies any suitable data struc-ture to efficiently arrange the plurality of different param-eters for consumption by the machine learning model(s) 222. In some examples, the aircraft information message 220 takes the form of a high-dimensional vector of param-eters that is fed as input to the machine learning model(s) 222.

Figure 5:
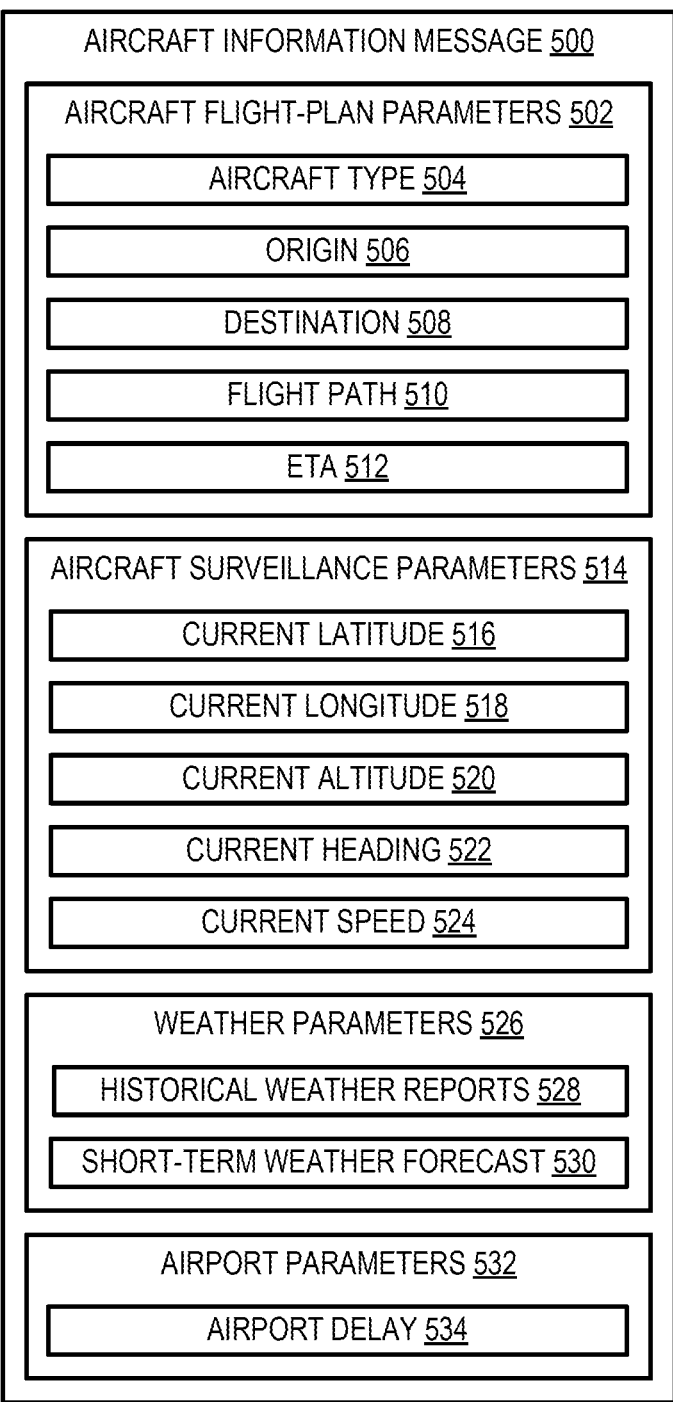
FIG. 5 shows an example aircraft information message having a designated format that is consumable by a machine learning model previously trained to assess delay predictions for aircraft flights.

FIG. 5 shows an example aircraft information message 500. For example, the aircraft information message 500 corresponds to the aircraft information messages 220 shown in FIG. 2. The aircraft information message 500 includes a plurality of aircraft flight-plan parameters 502 that are extracted from the aircraft flight-plan data feed 212 shown in FIG. 2. The plurality of aircraft flight-plan parameters 502 include an aircraft type 504 (e.g., including a make, a model, and a year of the aircraft); an origin 506 of the aircraft flight (e.g., an origin airport identifier); a destination 508 of the aircraft flight (e.g., a destination airport identifier); a flight path 510 of the aircraft flight (e.g., a series of waypoints between the origin and destination airports); and an esti-mated time of arrival (ETA) 512 of the aircraft flight (e.g., the ETA is determined prior to the aircraft flight taking place as opposed to a real-time flight delay prediction that is determined in real-time as the flight is taking place). In other examples, the aircraft information message 500 includes additional or alternative aircraft flight-plan parameters.

The aircraft information message 500 includes a plurality of aircraft surveillance parameters 514 that are extracted from the aircraft surveillance data feed 214 shown in FIG. 2. The plurality of aircraft surveillance parameters 514 indicate current conditions of the aircraft during the aircraft flight as measured by sensors or other tracking devices. The plurality of aircraft surveillance parameters 514 include a current latitude 516 of the aircraft; a current longitude 518 of the aircraft; a current altitude 520 of the aircraft; a current heading 522 of the aircraft; and a current speed 524 of the aircraft. In some examples, the plurality of aircraft surveil-lance parameters 514 are sensed or otherwise determined from sensors on-board the aircraft. In other examples, the aircraft information message 500 includes additional or alternative surveillance parameters.

The aircraft information message 500 includes a plurality of weather parameters 526 that are extracted from the weather data feed 214 shown in FIG. 2. The plurality of weather parameters 526 include parameters associated with historical weather reports 528 (e.g., historical average temperature, historical average chance of precipitation, historical average windspeed) for the region in which the aircraft flight takes place. In some examples, the historical weather parameters 528 include METAR or SA weather data for hourly surface weather observations. The plurality of weather parameters 526 further include parameters associated with a short-term weather forecast 530 (e.g., precipitation based on doppler radar, current temperature, current windspeed). In some examples, the current weather parameters 530 include TAF weather data of expected meteorological conditions at an airport associated with the aircraft flight. In other examples, the aircraft information message 500 includes additional or alternative weather parameters.

In some embodiments, the aircraft information message 500 includes one or more airport parameters 532 that are extracted from the airport data feed 218 shown in FIG. 2. The one or more airport parameters 532 include an airport delay parameter 534 for an airport associated with the current aircraft flight. For example, the airport delay parameter 534 includes various delay causing events, such as a weather delay (e.g., a fog delay, an ice delay) or a traffic delay (e.g., conditions where aircraft have to assume holding patterns based on air traffic). In some examples, the airport delay parameter 534 includes a delay time associated with such delay-causing events at the airport.

The aircraft information message 500 is provided as a non-limiting example. In some embodiments, the aircraft information message 500 includes additional or alternative parameters that are used to predict a flight-delay for an aircraft flight.

Returning to FIG. 2, the data consumption computing nodes 204 are configured to repeatedly generate aircraft information messages 220 for an aircraft flight throughout the duration of the aircraft flight based at least on receiving undated information from the plurality of data feeds 210. Each newly generated aircraft information message 220 includes updated information related to the current conditions of the aircraft flight. The data consumption computing nodes 204 are configured to generate aircraft information messages 220 at any suitable frequency. In some examples, a frequency at which aircraft information messages 220 are generated are based at least on a frequency at which the plurality of data feeds 210 are received.

In some embodiments, the data consumption computing node(s) 204 are configured to store one or more processed aircraft information message 220 in a distributed file system 224. By storing the aircraft information message(s) 220 in the distributed file system 224, the aircraft information message(s) 220 are made accessible to any of the computing nodes 202 of the computing system 200. For example, a prediction computing node 208 retrieves an aircraft information message 220 to use as input to a machine learning model 222.

The distributed file system 224 can be distributed in any suitable manner across the plurality of computing nodes 202. The distributed file system 224 can be implemented using any suitable file storage framework. In one example, the distributed file system 224 is implemented using the Apache Hadoop framework.

The training computing node(s) 206 are configured to train the machine learning models 222 with training data 226 stored in the distributed file system 224. In some examples, the training data 226 includes training flight-plan parameters, training aircraft surveillance parameters, and training weather parameters from a plurality of previously-completed aircraft flights. In some examples, such parameters are extracted from a completed-aircraft flight data feed 228 by the data consumption computing node(s) 204. For example, the completed-aircraft flight data feed 228 may be provided by airport authorities or inferred from historical surveillance data of the previously completed aircraft flights.

In some examples, the training data 226 includes actual delays for a plurality of previously-completed aircraft flights (i.e., ground truth) and flight-delay predictions for the plurality of previously-completed aircraft flights output by the prediction computing node(s) 208 of the computing system 200. In some examples, the training data 226 is distributed among the different training computing nodes 206 of the system to fit the machine learning model(s) 222. In other words, in some examples, the plurality of computing nodes 202 include a sub-set of two or more training computing nodes 206 that are configured to train different machine learning models 222 to assess delay predictions for aircraft flights in parallel.

The training computing node(s) 206 can be configured to train any suitable type of machine learning or artificial intelligence model to assess real-time delay predictions for aircraft flights based at least on the training data 226. Non-limiting examples of distinct types of models that are trained by the training computing node(s) 206 include gradient-boost regressor (GBR), random-forest regressor (RFR), fully connected neural network (FC-NN), and linear stochastic estimation (LSE). Any suitable combination of state-of-the-art and/or future machine learning (ML) and/or artificial intelligence (AI) can be used for training the machine learning model(s) 222. In some examples, the training computing node(s) 206 use a same type of big-data environment (e.g., Apache Spark) as used by the data consumption computing nodes 204 for the training process.

Non-limiting examples of training procedures for adjusting trainable parameters include supervised training (e.g., using gradient descent or any other suitable optimization method), zero-shot, few-shot, unsupervised learning methods (e.g., classification based at least on classes derived from unsupervised clustering methods), reinforcement learning (e.g., deep Q learning based at least on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein are trained simultaneously with regard to an objective function measuring performance of collective functioning of the plurality of components (e.g., with regard to reinforcement feedback and/or with regard to labelled training data). Simultaneously training the plurality of methods, processes, and/or components improves such collective functioning. In some examples, one or more methods, processes, and/or components are trained independently of other components (e.g., offline training on historical data).

In some embodiments, the training computing node(s) 206 are configured to perform weighted training in which a delay prediction for a previously-completed aircraft flight having a smaller error relative to a corresponding actual delay is weighted more than a delay prediction for another previously-completed aircraft flight having a larger error relative to a corresponding actual delay. Such weighted training allows the machine learning models 222 to be tuned over time based on the weighted results to provide more accurate flight delay predictions.

The training computing node(s) 206 are configured to store the trained machine learning models 222 in the distributed file system 224, so that the trained machine learning models 222 are available to the prediction computing node(s) 208.

The prediction computing node(s) are configured to receive the aircraft information message(s) 220 for a current aircraft flight and provide the aircraft information message(s) 220 as input to a previously-trained machine learning model 222 to assess a real-time delay prediction 230 for the current aircraft flight based at least on one or more flight-plan parameters 502 (shown in FIG. 5), one or more aircraft surveillance parameters 514 (shown in FIG. 5), and the one or more weather parameters 526 (shown in FIG. 5) included in the aircraft information message(s) 220. In some embodiments where the aircraft information message 220 further includes the airport delay parameter 534 (shown in FIG. 5), the machine learning model(s) 222 are configured to assesses the real-time delay prediction(s) 230 for the current aircraft flight further based at least on the airport delay parameter 534 (shown in FIG. 5).

In some examples, a real-time delay prediction 230 for a current aircraft flight is a real-time snapshot prediction of a time when the aircraft will arrive at the destination airport based on current conditions of the aircraft. In some examples, a real-time delay prediction 230 for a current aircraft flight is a time difference between a scheduled or expected arrival time of the aircraft at the destination and the predicted arrival time. Note that although the predictions are referred to as being "delay" predictions, in some cases, the predictions indicate when an aircraft is ahead of schedule or indicates a predicted arrival time that is prior to a scheduled or expected arrival time. The real-time delay prediction 230 can have any suitable time granularity. In some examples, the real-time delay prediction 230 has a granularity or error threshold of under a minute or on the order of seconds.

In some examples, the aircraft information message 220 for a given aircraft flight is loaded into a single prediction computing node 208 and the prediction computing node 208 assess the real-time delay prediction 230 using a previously-trained machine learning model 222. In this scenario, the computing system 200 outputs as many real-time flight delay predictions as there are prediction computing nodes 208 (e.g., a number of cores of the available computers) available in the computing system 200. The prediction computing node(s) 208 are configured to output the real-time delay predictions 230 repeatedly throughout the course of an aircraft flight to provide updated delay predictions as conditions change. The prediction computing node(s) 208 can be configured to output the real-time delay predictions 230 at any suitable frequency.

In some examples, different prediction computing nodes 208 assess real-time predictions 230 for the same aircraft flight using distinct types of previously-trained machine learning models 222 in order to determine which model is more accurate given the specific input parameters for the given conditions.

The prediction computing node(s) 208 can be configured to output the real-time delay predictions 230 to any suitable downstream target. In some examples, the prediction computing node(s) 208 are configured to publish one or more real-time delay prediction data feeds 232. For example, a different data feed can be published for each aircraft flight to receive updated predictions as the aircraft flight takes places. In some examples, the data feed is published using a streaming context platform, such as Apache Kafka. In some examples, the real-time delay prediction data feed 232 includes delay predictions generated by all of the different prediction computing nodes 208 of the computing system 200. Any suitable computing node of the computing system 200 can receive the real-time delay prediction data feed 232. In some examples, other remote computers or computing nodes receive the real-time delay prediction data feed 232, such as computers associated with airlines, aircraft manufacturers, airport authorities, regulatory agencies, and/or individual users.

Figure 6:
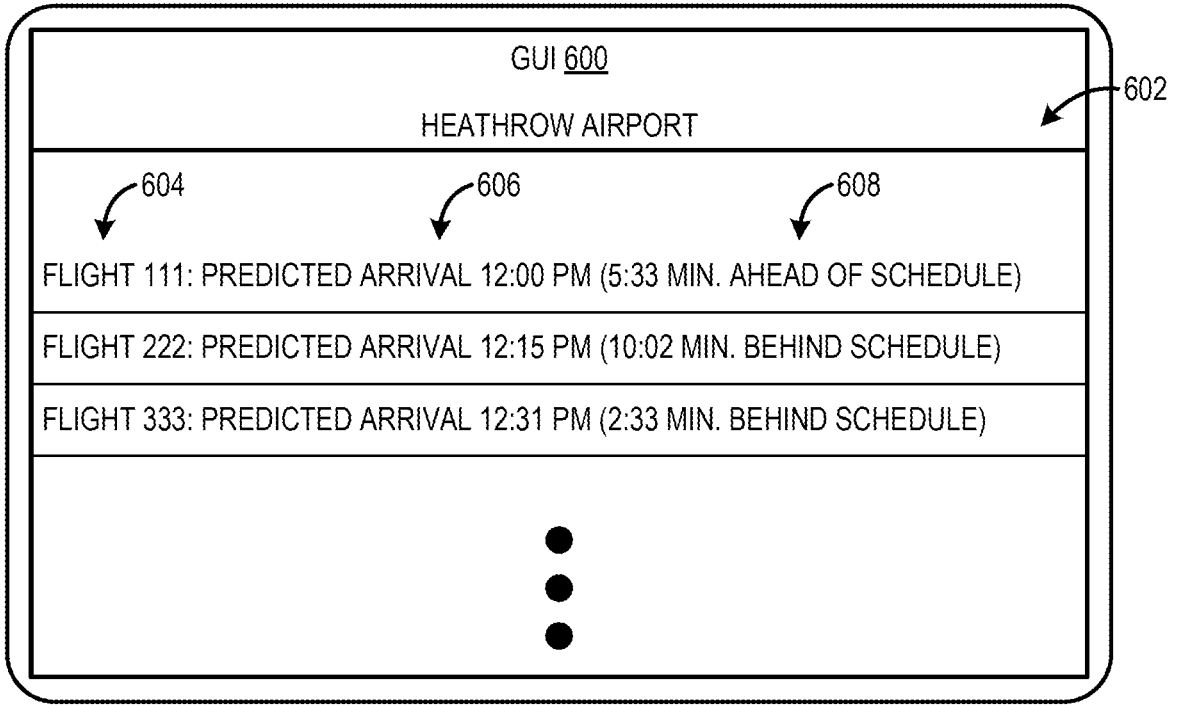
FIG. 6 shows an example graphical user interface configured to visually present real-time flight-delay predictions.

A computing node of the plurality of computing nodes 202 is configured to visually present one or more real-time delay predictions 230 in a graphical user interface (GUI) accessible through one of the ports of the computing system 200. FIG. 6 shows an example GUI 600 that can be displayed by a computing node of the computing system 200. In the illustrated example, the GUI 600 visually presents a flight schedule of aircraft arrivals at Heathrow Airport. Each aircraft flight listed in the flight schedule 602 includes a flight number 604, a real-time delay prediction 606, and an indication 608 of whether the aircraft flight is ahead of schedule or delayed relative to the expected arrival time.

A GUI can be configured to visually present real-time delay predictions for any suitable number of aircraft flights. In some examples, such a GUI visually presents real-time delay predictions for aircraft flights for a plurality of different airports.

Returning to FIG. 2, in some embodiments, one or more computing nodes of the plurality of computing nodes 202 is designated as a cluster manager computing node 234 configured to dynamically manage a designation of each of the plurality of computing nodes 202 to operate as a data consumption computing node, a prediction computing node, or a training computing node.

In some examples, the cluster manager computing node 234 designates different computing nodes as data consumption computing nodes to meet the demand of the number of data feeds that are available to be processed. For example, as the number of data feeds increases, the number of computing nodes that are designated as data consumption computing nodes is also increased to handle the increased processing load.

In some examples, the cluster manager computing node 234 is configured to dynamically assign designations to different computing nodes based at least on a total number of current aircraft flights being monitored by the computing system 200. For example, under conditions where there is a higher number of concurrent aircraft flights, the cluster manager computing node 234 dynamically designates more computing nodes to function as prediction computing nodes 208 and less computing nodes as training computing nodes 206. Further, under conditions where there is a lower number of concurrent aircraft flights, the cluster manager computing node 234 dynamically designates more computing nodes to function as training computing nodes 206 and less computing nodes as prediction computing nodes 208.

The cluster manager computing node 234 can dynamically designate computing nodes to separate roles in the computing system 200 based on any suitable operating conditions in order to balance providing real-time delay predictions for all monitored aircraft flights while efficiently training (re-training/updating) the machine learning models 222 to provide the most accurate real-time delay predictions.

Figure 7:
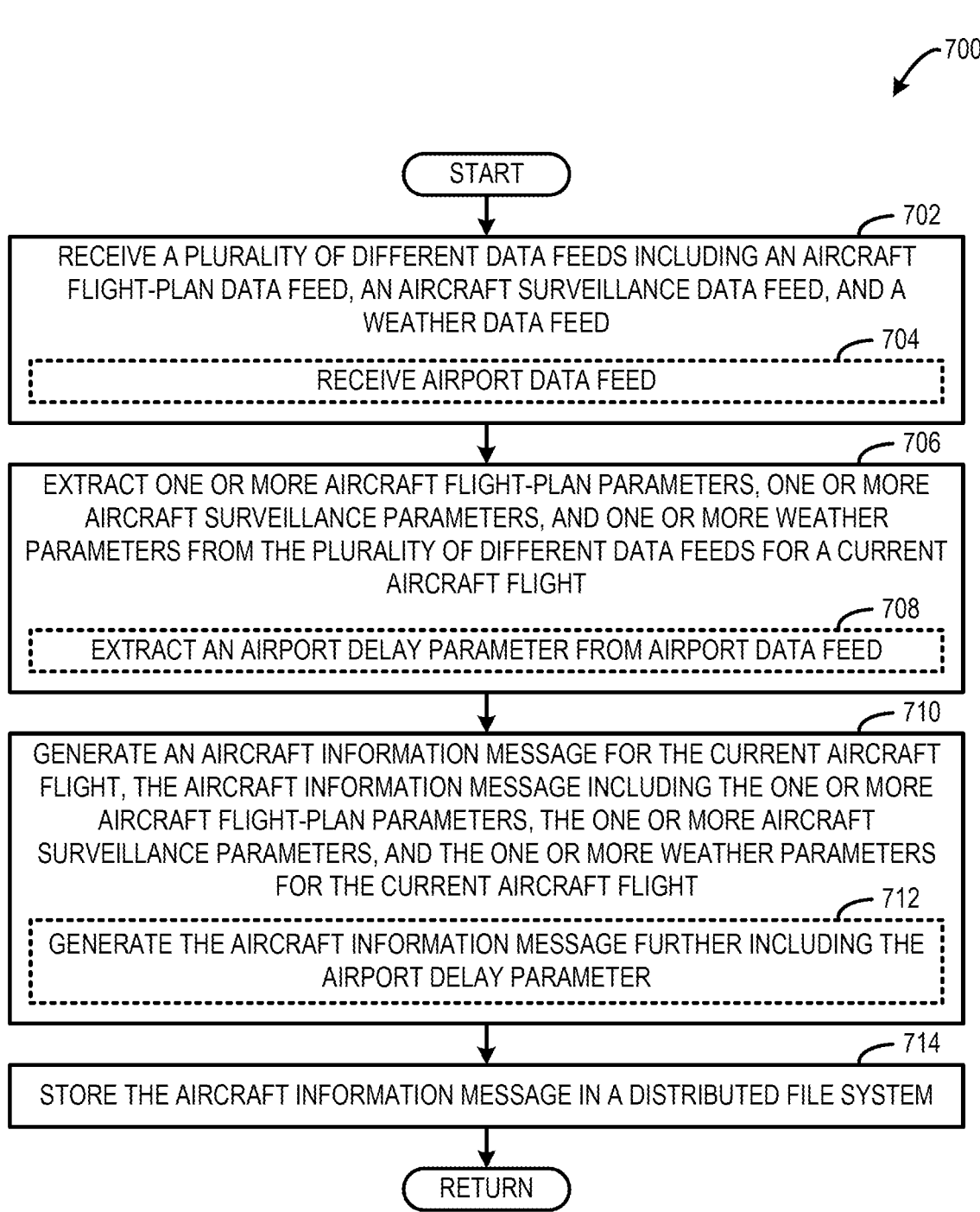
FIG. 7-9 show example methods for providing real-time flight-delay predictions of airborne flights in a large-scale environment.
Figure 8:
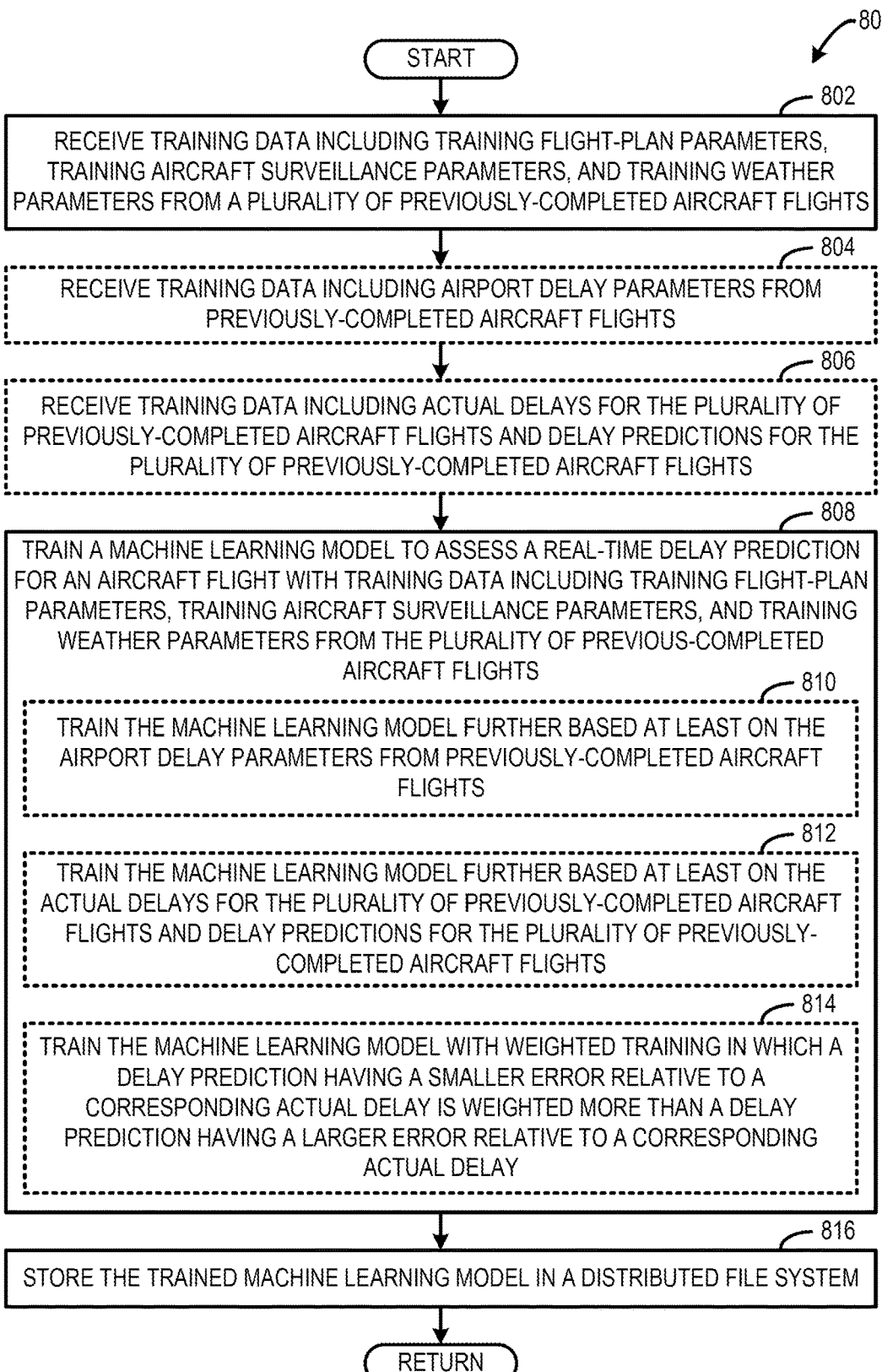
Figure 9:
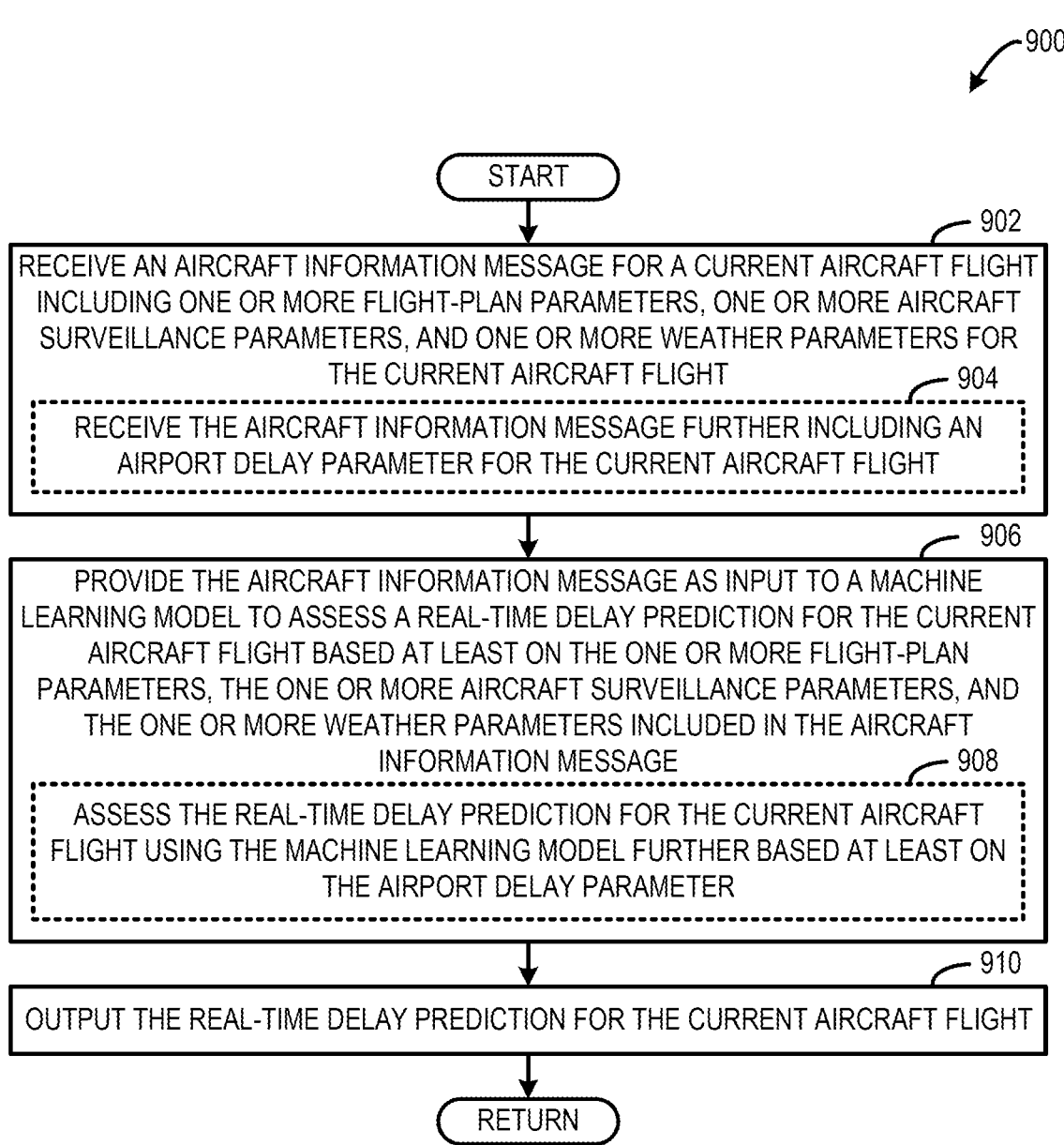

FIG. 7-9 show example methods for providing real-time flight-delay predictions of airborne flights in a large-scale environment. FIG. 7 shows an example method 700 for handling data consumption for providing real-time flight-delay predictions of airborne flights. For example, the method 700 can be performed by the data consumption computing node(s) 204 of the computing system 200 shown in FIG. 2. At 702, the method 700 includes receiving a plurality of different data feeds including an aircraft flight-plan data feed, an aircraft surveillance data feed, and a weather data feed. In some embodiments, at 704, the method 700 can include receiving an airport data feed. At 706, the method 700 includes extract one or more aircraft flight-plan parameters, one or more aircraft surveillance parameters, and one or more weather parameters from the plurality of different data feeds for a current aircraft flight. In some embodiments, at 708, the method 700 can include extracting an airport delay parameter from the airport data feed. At 710, the method 700 includes generating an aircraft information message for the current aircraft flight. The aircraft information message has a designated format consumable by a machine learning model, such as the previously-trained machine learning model 222 shown in FIG. 2. The aircraft information message includes the one or more aircraft flight-plan parameters, the one or more aircraft surveillance parameters, and the one or more weather parameters for the current aircraft flight. In some embodiments, at 712, the method 700 can include generating the aircraft information message further including the airport delay parameter. At 714, the method 700 includes storing the aircraft information message in a distributed file system, such as the distributed file system 224 shown in FIG. 2 and returning to other operations. Storing the aircraft information message in the distributed file system allows the aircraft information message to be accessible to be retrieved by any of the plurality of computing nodes 202 of the computing system 200.

The method 700 can be performed repeatedly to generate aircraft information messages through the course of an aircraft flight to provide updated information about the aircraft flight. Further, the method 700 can be performed repeatedly to generate aircraft information messages for different aircraft flights.

FIG. 8 shows an example training method 800. For example, the training method 800 can be performed by the training computing nodes 206 shown in FIG. 2. At 802, the method 800 includes receiving training data including training flight-plan parameters, training aircraft surveillance parameters, and training weather parameters from a plurality of previously-completed aircraft flights. In some examples, the training data can include aircraft information messages generated for the plurality of previously-completed aircraft flights. In some embodiments, at 804, the method 800 can include receiving training data including airport delay parameters from previously-completed aircraft flights. In some embodiments, at 806, the method 800 can include receiving training data includes actual delays for the plurality of previously-completed aircraft flights and delay predictions for the plurality of previously-completed aircraft flights. At 808, the method 800 includes training a machine learning model to assess a real-time delay prediction for an aircraft flight with the training data including training flight-plan parameters, training aircraft surveillance parameters, and training weather parameters from a plurality of previously-completed aircraft flights. In some embodiments, at 810, the method 800 can include training the machine learning model further based at least on the airport delay parameters from the previously-completer aircraft flights. In some embodiments, at 812, the method 800 can include training the machine learning model further based at least on the actual delays for the plurality of previously-completed aircraft flights and delay predictions for the plurality of previously-completed aircraft flights. In some embodiments, at 814, the method 800 can include training the machine learning model with weighted training in which a delay prediction having a smaller error relative to a corresponding actual delay is weighted more than a delay prediction having a larger error relative to a corresponding actual delay. At 816, the method 800 includes storing the trained machine learning model in a distributed file system. Storing the trained machine learning model in the distributed file system allows the trained machine learning model to be accessible to be retrieved by any of the plurality of computing nodes 202 of the computing system 200.

The method 800 can be performed repeatedly to train distinct types of machine learning models. Further, the method 800 can be performed repeatedly to re-train/update the machine learning models with updated information to increase the accuracy of the real-time flight-delay predictions.

FIG. 9 shows an example prediction method 900. For example, the prediction method 900 can be performed by the prediction computing nodes 208 shown in FIG. 2. At 902, the method 900 includes receiving an aircraft information message for a current aircraft flight. The aircraft information message has a designated format consumable by a machine learning model previously trained to assess delay predictions for aircraft flights. The aircraft information message includes one or more aircraft flight-plan parameters, one or more aircraft surveillance parameters, and one or more weather parameters for the current aircraft flight. In some embodiments, at 904, the method 900 includes receiving the aircraft information message further including an airport delay parameter for the current aircraft flight. At 906, the method 900 includes providing the aircraft information message as input to the machine learning model to assess a real-time delay prediction for the current aircraft flight based at least on the one or more flight-plan parameters, the one or more aircraft surveillance parameters, and the one or more weather parameters included in the aircraft information message. In some embodiments, at 908, the method 900 can include assessing the real-time delay prediction for the current aircraft flight using the machine learning model further based at least on the airport delay parameter. At 910, the method 900 includes outputting the real-time delay prediction for the current aircraft flight.

The method 900 can be performed repeatedly to generate real-time delay predictions throughout the course of an aircraft flight to provide updated predictions as conditions change. Further, the method 900 can be performed repeatedly to generate real-time delay predictions for different aircraft flights.

The computing system described herein employs a distributed computing architecture to provide flight-delay predictions of aircraft flights for a system-wide application in a real-time environment. The distributed architecture allows for the computing system to be scalable and dynamic to meet real-time conditions for any number of concurrent aircraft flights at any given time. The distributed architecture allows for the workload (e.g., data consumption, training, and predictions) to be spread among the different computing nodes, thus reducing the demand on any single computing node, and allowing for reduced computational times and increased capabilities with respect to serialized processes related to providing real-time delay predictions for aircraft flights.

In an example, a computing system comprises a plurality of computing nodes, wherein one or more computing nodes of the plurality of computing nodes is a data consumption computing node configured to receive a plurality of different data feeds including an aircraft flight-plan data feed, an aircraft surveillance data feed, and a weather data feed, extract one or more aircraft flight-plan parameters, one or more aircraft surveillance parameters, and one or more weather parameters from the plurality of different data feeds for a current aircraft flight, and generate an aircraft information message for the current aircraft flight, wherein the aircraft information message has a designated format consumable by a machine learning model previously trained to assess delay predictions for aircraft flights, the aircraft information message including the one or more aircraft flight-plan parameters, the one or more aircraft surveillance parameters, and the one or more weather parameters for the current aircraft flight, and wherein one or more computing nodes of the plurality of computing nodes is a prediction computing node configured to receive the aircraft information message for the current aircraft flight, provide the aircraft information message as input to the machine learning model to assess a real-time delay prediction for the current aircraft flight based at least on the one or more flight-plan parameters, the one or more aircraft surveillance parameters, and the one or more weather parameters included in the aircraft information message, and output the real-time delay prediction for the current aircraft flight. In this example and/or other examples, the plurality of computing nodes may include a sub-set of two or more prediction computing nodes configured to output different real-time delay predictions for different current aircraft flights in parallel. In this example and/or other examples, one or more computing nodes of the plurality of computing nodes may be a training computing node configured to train the machine learning model with training data including training flight-plan parameters, training aircraft surveillance parameters, and training weather parameters from a plurality of previously-completed aircraft flights. In this example and/or other examples, the training data may include actual delays for the plurality of previously-completed aircraft flights and delay predictions for the plurality of previously-completed aircraft flights, and the training computing node may be configured to perform weighted training in which a delay prediction having a smaller error relative to a corresponding actual delay is weighted more than a delay prediction having a larger error relative to a corresponding actual delay. In this example and/or other examples, the plurality of computing nodes may include a sub-set of two or more training computing nodes configured to train different machine learning models to assess delay predictions for aircraft flights in parallel. In this example and/or other examples, one or more computing nodes of the plurality of computing nodes may be a cluster manager computing node configured to dynamically manage a designation of each of the plurality of computing nodes to operate as a data consumption computing node, a prediction computing node, or a training computing node based at least on a total number of current aircraft flights being monitored by the computing system. In this example and/or other examples, the one or more flight-plan parameters may include one or more of an aircraft type, an origin, a destination, a flight path, and an estimated time of arrival of the current aircraft flight. In this example and/or other examples, the one or more aircraft surveillance parameters may include one or more of a current latitude, a current longitude, a current altitude, a current heading, and a current speed of the current aircraft flight. In this example and/or other examples, the one or more weather parameters may include one or more of historical weather reports and a short-term weather forecast along a flight path of the current aircraft flight. In this example and/or other examples, the plurality of different data feeds may include an airport data feed, the data consumption computing node may be configured to extract, from the airport data feed, an airport delay parameter for an airport associated with the current aircraft flight, the aircraft information message may include the airport delay parameter, and the machine learning model may be configured to assess the real-time delay prediction for the current aircraft flight based at least on the airport delay parameter.

In another example, a computer-implemented method comprises receiving an aircraft information message for a current aircraft flight, the aircraft information message having a designated format consumable by a machine learning model previously trained to assess delay predictions for aircraft flights, the aircraft information message including one or more aircraft flight-plan parameters, one or more aircraft surveillance parameters, and one or more weather parameters for the current aircraft flight, providing the aircraft information message as input to the machine learning model to assess a real-time delay prediction for the current aircraft flight based at least on the one or more flight-plan parameters, the one or more aircraft surveillance parameters, and the one or more weather parameters included in the aircraft information message, and outputting the real-time delay prediction for the current aircraft flight. In this example and/or other examples, the aircraft information message may be generated by extracting the one or more aircraft flight-plan parameters from an aircraft flight-plan data feed, the one or more aircraft surveillance parameters from an aircraft surveillance data feed, and the one or more weather parameters from a weather data feed for the current aircraft flight. In this example and/or other examples, the aircraft information message may further include an airport delay parameter extracted from an airport data feed for an airport associated with the current aircraft flight, and the machine learning model may be previously trained to assess the real-time delay prediction for the current aircraft flight based at least on the airport delay parameter. In this example and/or other examples, the machine learning model may be previously trained with training data including training flight-plan parameters, training aircraft surveillance parameters, and training weather parameters from a plurality of previously-completed aircraft flights. In this example and/or other examples, the training data may include actual delays for the plurality of previously-completed aircraft flights and delay predictions for the plurality of previously-completed aircraft flights, and the machine learning model may be previously trained such that a delay prediction having a smaller error relative to a corresponding actual delay is weighted more than a delay prediction having a larger error relative to a corresponding actual delay. In this example and/or other examples, the one or more flight-plan parameters may include one or more of an aircraft type, an origin, a destination, a flight path, and an estimated time of arrival of the current aircraft flight. In this example and/or other examples, the one or more aircraft surveillance parameters may include one or more of a current latitude, a current longitude, a current altitude, a current heading, and a current speed of the current aircraft flight. In this example and/or other examples, the one or more weather parameters may include one or more of historical weather reports and a short-term weather forecast along a flight path of the current aircraft flight.

In yet another example, a computing system comprises a plurality of computing nodes, wherein one or more computing nodes of the plurality of computing nodes is a data consumption computing node configured to receive a plurality of different data feeds including an aircraft flight-plan data feed, an aircraft surveillance data feed, and a weather data feed, extract one or more aircraft flight-plan parameters, one or more aircraft surveillance parameters, and one or more weather parameters from the plurality of different data feeds for a current aircraft flight, and generate an aircraft information message for the current aircraft flight, wherein the aircraft information message has a designated format consumable by a machine learning model previously trained to assess delay predictions for aircraft flights, the aircraft information message including the one or more aircraft flight-plan parameters, the one or more aircraft surveillance parameters, and the one or more weather parameters for the current aircraft flight, wherein one or more computing nodes of the plurality of computing nodes is a prediction computing node configured to receive the aircraft information message for the current aircraft flight, provide the aircraft information message as input to the machine learning model to assess a real-time delay prediction for the current aircraft flight based at least on the one or more flight-plan parameters, the one or more aircraft surveillance parameters, and the one or more weather parameters included in the aircraft information message, and output the real-time delay prediction for the current aircraft flight; and wherein one or more computing nodes of the plurality of computing nodes is a training computing node configured to train the machine learning model with training data including training flight-plan parameters, training aircraft surveillance parameters, and training weather parameters from a plurality of previously-completed aircraft flights. In this example and/or other examples, one or more computing nodes of the plurality of computing nodes may be a cluster manager computing node configured to dynamically manage a designation of each of the plurality of computing nodes to operate as a data consumption computing node, a prediction computing node, or a training computing node based at least on a total number of current aircraft flights being monitored by the computing system.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein can define patentable subject matter apart from the disclosed examples and can find utility in other implementations not expressly disclosed herein.

The invention claimed is:

1. A computing system comprising:
a plurality of computing nodes, each computing node of the plurality of computing nodes including a logic processor and a non-volatile storage device holding instructions executable by the logic processor, wherein the plurality of computing nodes includes a sub-set of two or more prediction computing nodes, each prediction computing node of the sub-set of prediction computing nodes being configured to:
receive an aircraft information message for a respective current aircraft flight having a designated format consumable by a machine learning model previously trained to assess delay predictions for aircraft flights, the aircraft information message including one or more aircraft flight-plan parameters, one or more aircraft surveillance parameters, and one or more weather parameters for the respective current aircraft flight,
provide the aircraft information message as input to the machine learning model to assess a real-time delay prediction for the respective current aircraft flight based at least on the one or more aircraft flight-plan parameters, the one or more aircraft surveillance parameters, and the one or more weather parameters included in the aircraft information message, wherein the real-time delay prediction for the respective current aircraft flight indicates a predicted arrival time of the aircraft and an indication whether the aircraft is ahead of schedule or behind schedule relative to an expected arrival time, wherein the machine learning model is previously trained with training data including training flight-plan parameters, training aircraft surveillance parameters, and training weather parameters from a plurality of previously-completed aircraft flights, wherein the training data further includes actual arrival times for the plurality of previously-completed aircraft flights and delay predictions for the plurality of previously-completed aircraft flights that include delay predictions for previously-completed aircraft flights that arrived ahead of schedule relative to an expected arrival time and delay predictions for previously-completed aircraft flights that arrived behind schedule relative to an expected arrival time, and wherein the machine learning model is previously trained using weighted training in which a delay prediction having a smaller error relative to a corresponding actual delay is weighted more than a delay prediction having a larger error relative to a corresponding actual delay, and
output the real-time delay prediction for the respective current aircraft flight in a format that is consumable by a distributed event streaming platform that is configured to publish data feeds of real-time delay predictions output by the sub-set of prediction computing nodes, including the real-time delay prediction for the respective current aircraft flight output by each computing node of the sub-set of prediction computing nodes; and
wherein the plurality of computing nodes includes a computing node that is configured to:
receive, via the distributed event streaming platform, a plurality of data feeds of real-time delay predictions for a plurality of current aircraft flights, including the real-time delay prediction for the respective current aircraft flight output by each computing node of the sub-set of prediction computing nodes;
extract a plurality of real-time delay predictions for the plurality of current aircraft flights from the plurality of data feeds, including the real-time delay prediction for the respective current aircraft flight output by each computing node of the sub-set of prediction computing nodes; and
visually present the plurality of real-time delay predictions for the plurality of current aircraft flights in a graphical user interface (GUI).

2. The computing system of claim 1,
wherein one or more computing nodes of the plurality of computing nodes is a data consumption computing node configured to:

receive a plurality of different data feeds including an aircraft flight-plan data feed, an aircraft surveillance data feed, and a weather data feed, extract one or more aircraft flight-plan parameters, one or more aircraft surveillance parameters, and one or more weather parameters from the plurality of different data feeds for the respective current aircraft flight, and generate the aircraft information message for the respective current aircraft flight, according to the designated format consumable by the machine learning model.

3. The computing system of claim 2, wherein the sub-set of two or more prediction computing nodes is configured to output different real-time delay predictions for different current aircraft flights in parallel.

4. The computing system of claim 2, wherein one or more computing nodes of the plurality of computing nodes is a training computing node configured to train the machine learning model with the training data including the training flight-plan parameters, the training aircraft surveillance parameters, and the training weather parameters from the plurality of previously-completed aircraft flights.

5. The computing system of claim 2, wherein one or more computing nodes of the plurality of computing nodes is a cluster manager computing node configured to dynamically manage a designation of each of the plurality of computing nodes to operate as a data consumption computing node, a prediction computing node, or a training computing node based at least on a total number of current aircraft flights being monitored by the computing system.

6. The computing system of claim 2, wherein the plurality of different data feeds includes an airport data feed, wherein the data consumption computing node is configured to extract, from the airport data feed, an airport delay parameter for an airport associated with the respective current aircraft flight, wherein the aircraft information message includes the airport delay parameter, and wherein the machine learning model is configured to assess the real-time delay prediction for the respective current aircraft flight based at least on the airport delay parameter.

7. The computing system of claim 1, wherein the one or more aircraft flight-plan parameters include one or more of an aircraft type, an origin, a destination, a flight path, and an estimated time of arrival of the respective current aircraft flight.

8. The computing system of claim 1, wherein the one or more aircraft surveillance parameters include one or more of a current latitude, a current longitude, a current altitude, a current heading, and a current speed of the respective current aircraft flight.

9. The computing system of claim 1, wherein the one or more weather parameters include one or more of historical weather reports and a short-term weather forecast along a flight path of the respective current aircraft flight.

10. A computer-implemented method comprising:

receiving an aircraft information message for a respective current aircraft flight, the aircraft information message having a designated format consumable by a machine learning model previously trained to assess delay predictions for aircraft flights, the aircraft information message including one or more aircraft flight-plan parameters, one or more aircraft surveillance parameters, and one or more weather parameters for the respective current aircraft flight, wherein the machine learning model is previously trained with training data including training flight-plan parameters, training aircraft surveillance parameters, and training weather parameters from a plurality of previously-completed aircraft flights, wherein the training data further includes actual arrival times for the plurality of previously-completed aircraft flights and delay predictions for the plurality of previously-completed aircraft flights that include delay predictions for previously-completed aircraft flights that arrived ahead of schedule relative to an expected arrival time and delay predictions for previously-completed aircraft flights that arrived behind schedule relative to an expected arrival time, and wherein the machine learning model is previously trained using weighted training in which a delay prediction having a smaller error relative to a corresponding actual delay is weighted more than a delay prediction having a larger error relative to a corresponding actual delay;

providing the aircraft information message as input to the machine learning model to assess a real-time delay prediction for the respective current aircraft flight based at least on the one or more aircraft flight-plan parameters, the one or more aircraft surveillance parameters, and the one or more weather parameters included in the aircraft information message wherein the real-time delay prediction for the respective current aircraft flight indicates a predicted arrival time of the aircraft and an indication whether the aircraft is ahead of schedule or behind schedule relative to an expected arrival time;

outputting the real-time delay prediction for the respective current aircraft flight in a format that is consumable by a distributed event streaming platform that is configured to publish a data feed of real-time delay predictions for the respective current aircraft flight;

receiving, via the distributed event streaming platform, a plurality of data feeds of real-time delay predictions for a plurality of current aircraft flights, including the real-time delay prediction for the respective current aircraft flight;

extracting a plurality of real-time delay predictions for the plurality of current aircraft flights from the plurality of data feeds, including the real-time delay prediction for the respective current aircraft flight; and visually presenting the plurality of real-time delay predictions for the plurality of current aircraft flights in a graphical user interface (GUI).

11. The computer-implemented method of claim 10, wherein the aircraft information message is generated by extracting the one or more aircraft flight-plan parameters from an aircraft flight-plan data feed, the one or more aircraft surveillance parameters from an aircraft surveillance data feed, and the one or more weather parameters from a weather data feed for the respective current aircraft flight.

12. The computer-implemented method of claim 11, wherein the aircraft information message further includes an airport delay parameter extracted from an airport data feed for an airport associated with the respective current aircraft flight, and wherein the machine learning model is previously trained to assess the real-time delay prediction for the respective current aircraft flight based at least on the airport delay parameter.

13. The computer-implemented method of claim 10, wherein the one or more aircraft flight-plan parameters include one or more of an aircraft type, an origin, a destination, a flight path, and an estimated time of arrival of the respective current aircraft flight.

14. The computer-implemented method of claim 10, wherein the one or more aircraft surveillance parameters include one or more of a current latitude, a current longitude, a current altitude, a current heading, and a current speed of the respective current aircraft flight.

15. The computer-implemented method of claim 10, wherein the one or more weather parameters include one or more of historical weather reports and a short-term weather forecast along a flight path of the respective current aircraft flight.

16. A computing system comprising:

a plurality of computing nodes, each computing node of the plurality of computing nodes including a logic processor and a non-volatile storage device holding instructions executable by the logic processor;

wherein a first set of one or more computing nodes of the plurality of computing nodes are designated as a data consumption computing node configured to:

receive a plurality of different data feeds including an aircraft flight-plan data feed, an aircraft surveillance data feed, and a weather data feed, extract one or more aircraft flight-plan parameters, one or more aircraft surveillance parameters, and one or more weather parameters from the plurality of different data feeds for a respective current aircraft flight, and generate an aircraft information message for the respective current aircraft flight, wherein the aircraft information message has a designated format consumable by a machine learning model previously trained to assess delay predictions for aircraft flights, the aircraft information message including the one or more aircraft flight-plan parameters, the one or more aircraft surveillance parameters, and the one or more weather parameters for the respective current aircraft flight, wherein the machine learning model is previously trained with training data including training flight-plan parameters, training aircraft surveillance parameters, and training weather parameters from a plurality of previously-completed aircraft flights, wherein the training data further includes actual arrival times for the plurality of previously-completed aircraft flights and delay predictions for the plurality of previously-completed aircraft flights that include delay predictions for previously-completed aircraft flights that arrived ahead of schedule relative to an expected arrival time and delay predictions for previously-completed aircraft flights that arrived behind schedule relative to an expected arrival time, and wherein the machine learning model is previously trained using weighted training in which a delay prediction having a smaller error relative to a corresponding actual delay is weighted more than a delay prediction having a larger error relative to a corresponding actual delay;

wherein a second set of one or more computing nodes of the plurality of computing nodes are designated as a prediction computing node configured to:

receive the aircraft information message for the respective current aircraft flight, provide the aircraft information message as input to the machine learning model to assess a real-time delay prediction for the respective current aircraft flight based at least on the one or more aircraft flight-plan parameters, the one or more aircraft surveillance parameters, and the one or more weather parameters included in the aircraft information message, wherein the real-time delay prediction for the respective current aircraft flight indicates a predicted arrival time of the aircraft and an indication whether the aircraft is ahead of schedule or behind schedule relative to an expected arrival time, and output the real-time delay prediction for the respective current aircraft flight in a format that is consumable by a distributed event streaming platform that is configured to publish a data feed of real-time delay predictions for the respective current aircraft flight;

wherein a third set of one or more computing nodes of the plurality of computing nodes are designated as a training computing node configured to:

train the machine learning model with the training data; and wherein a fourth set of one or more computing nodes of the plurality of computing nodes is configured to:

receive, via the distributed event streaming platform, a plurality of data feeds of real-time delay predictions for a plurality of current aircraft flights, including the real-time delay prediction for the respective current aircraft flight;

extract a plurality of real-time delay predictions for the plurality of current aircraft flights from the plurality of data feeds including the real-time delay prediction for the respective current aircraft flight; and visually present the plurality of real-time delay predictions for the plurality of current aircraft flights in a graphical user interface (GUI).

17. The computing system of claim 16, wherein a fifth set of one or more computing nodes of the plurality of computing nodes is designated as a cluster manager computing node configured to dynamically manage a designation of each of the plurality of computing nodes to operate as a data consumption computing node, a prediction computing node, or a training computing node based at least on a total number of current aircraft flights being monitored by the computing system.

18. The computing system of claim 1, wherein the prediction computing node is configured to repeatedly receive aircraft information messages during the respective current aircraft flight, provide the aircraft information messages as input to the machine learning model to repeatedly assess real-time delay predictions for the respective current aircraft flight based at least on one or more aircraft flight-plan parameters extracted from the aircraft information messages, and output the real-time delay predictions for the respective current aircraft flight during the respective current aircraft flight to the distributed event streaming platform.

19. The computer-implemented method of claim 10, further comprising:

repeatedly receiving aircraft information messages during the respective current aircraft flight;

providing the aircraft information messages as input to the machine learning model to repeatedly assess real-time delay predictions for the respective current aircraft flight based at least on one or more aircraft flight-plan parameters extracted from the aircraft information messages; and outputting the real-time delay predictions for the respective current aircraft flight during the respective current aircraft flight to the distributed event streaming platform.

20. The computing system of claim 16, wherein the second set of one or more computing nodes of the plurality of computing nodes that are designated as prediction computing nodes are configured to repeatedly receive aircraft information messages during the respective current aircraft flight, provide the aircraft information messages as input to the machine learning model to repeatedly assess real-time delay predictions for the respective current aircraft flight based at least on one or more aircraft flight-plan parameters extracted from the aircraft information messages, and output the real-time delay predictions for the respective current aircraft flight during the respective current aircraft flight to the distributed event streaming platform.

* * * * *